US010118291B2

(12) United States Patent
Asada et al.

(10) Patent No.: US 10,118,291 B2
(45) Date of Patent: Nov. 6, 2018

(54) ROBOTIC SYSTEMS FOR SUPPORTING A USER

(71) Applicant: Massachusetts Institute of Technology, Cambridge, MA (US)

(72) Inventors: Haruhiko Harry Asada, Lincoln, MA (US); Daniel A. Kurek, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/455,517

(22) Filed: Mar. 10, 2017

(65) Prior Publication Data

US 2017/0259427 A1   Sep. 14, 2017

Related U.S. Application Data

(60) Provisional application No. 62/306,139, filed on Mar. 10, 2016.

(51) Int. Cl.
*B25J 9/00* (2006.01)
*B25J 13/08* (2006.01)

(52) U.S. Cl.
CPC .............. *B25J 9/0006* (2013.01); *B25J 13/08* (2013.01); *G05B 2219/40305* (2013.01)

(58) Field of Classification Search
CPC . B25J 9/0006; B25J 13/08; B25J 9/043; B25J 9/0084; B25J 9/0087; G05B 2219/40305
USPC ................................................. 700/245, 264
See application file for complete search history.

(56) References Cited

U.S. PATENT DOCUMENTS

| | | | | |
|---|---|---|---|---|
| 5,031,510 A * | 7/1991 | Krauter | ..................... | B25J 9/104 403/316 |
| 5,587,937 A * | 12/1996 | Massie | .................. | B25J 9/1689 700/264 |
| 7,857,774 B2 * | 12/2010 | Sankai | ................... | A61H 3/008 601/35 |
| 8,731,738 B2 * | 5/2014 | Agrawal | ............... | A61F 5/0102 701/1 |
| 9,198,821 B2 * | 12/2015 | Unluhisarcikli | ......... | A61H 3/00 |
| 9,351,900 B2 * | 5/2016 | Walsh | ..................... | A61H 1/024 |
| 9,381,642 B2 * | 7/2016 | Asada | ......................... | B25J 5/00 |
| 9,719,633 B2 * | 8/2017 | Sacksteder | ............ | B25J 9/0006 |
| 9,789,603 B2 * | 10/2017 | Jacobsen | .................... | B25J 3/04 |
| 9,808,073 B1 * | 11/2017 | Maxwell | ................... | A45F 5/00 |
| 2010/0113980 A1* | 5/2010 | Herr | ......................... | A61F 2/60 600/587 |

(Continued)

FOREIGN PATENT DOCUMENTS

EP      3196484 A1 * 7/2017
JP      11-309184 A   11/1999

(Continued)

OTHER PUBLICATIONS

International Search Report and Written Opinion dated May 24, 2017 for Application No. PCT/US2017/021728.
Llorens-Bonilla et al., A robot on the shoulder: Coordinated human-wearable robot control using coloured petri nets and partial least squares predictions. 2014 IEEE International Conference on Robotics and Automation (ICRA), Hong Kong, China, May 31-Jun. 7, 2014; pp. 119-125.

(Continued)

*Primary Examiner* — Jaime Figueroa
(74) *Attorney, Agent, or Firm* — Wolf, Greenfield & Sacks, P.C.

(57) ABSTRACT

Robotic systems for supporting a human in stationary and/or mobile applications and related methods of operation are described.

30 Claims, 11 Drawing Sheets

(56) References Cited

U.S. PATENT DOCUMENTS

| | | | |
|---|---|---|---|
| 2011/0082566 A1* | 4/2011 | Herr | A61F 2/60 623/24 |
| 2012/0059548 A1* | 3/2012 | Agrawal | A61F 5/0102 701/41 |
| 2012/0328395 A1* | 12/2012 | Jacobsen | B25J 3/04 414/1 |
| 2013/0226048 A1* | 8/2013 | Unluhisarcikli | A61H 3/00 601/34 |
| 2015/0001269 A1* | 1/2015 | Sacksteder | B25J 9/0006 224/576 |
| 2015/0173993 A1* | 6/2015 | Walsh | A61H 1/024 414/4 |
| 2015/0209215 A1* | 7/2015 | Lee | A61H 1/0237 623/27 |
| 2015/0217444 A1* | 8/2015 | Asada | B25J 5/00 700/258 |
| 2015/0272809 A1* | 10/2015 | Accoto | A61H 1/0237 623/31 |
| 2016/0030201 A1* | 2/2016 | Zoss | A61F 5/01 623/24 |
| 2016/0096268 A1* | 4/2016 | Genani | B25J 19/0012 700/245 |
| 2016/0107309 A1* | 4/2016 | Walsh | B25J 9/0006 248/550 |
| 2016/0270997 A1* | 9/2016 | Little | A61H 3/00 |
| 2016/0346156 A1* | 12/2016 | Walsh | A63B 21/4009 |
| 2017/0087721 A1 | 3/2017 | Asada et al. | |
| 2017/0165833 A1* | 6/2017 | Park | B25J 9/0006 |
| 2017/0231787 A1* | 8/2017 | Noda | A61F 2/68 623/26 |

FOREIGN PATENT DOCUMENTS

| | | | | |
|---|---|---|---|---|
| JP | 2007-075974 A | 3/2007 | | |
| JP | 2012-135486 A | 7/2012 | | |
| JP | 2015-217159 A | 12/2015 | | |
| WO | WO-2012154580 A1 * | 11/2012 | | B25J 9/0006 |
| WO | WO-2016039140 A1 * | 3/2016 | | A61H 3/00 |

OTHER PUBLICATIONS

Parietti, Design and control of supernumerary robotic limbs. Doctoral Thesis Dissertation, Department of Mechanical Engineering, Massachusetts Institute of Technology, Sep. 2016. 181 pages.

Parietti et al., Supernumerary robotic limbs for human body support. IEEE Transactions on Robotics. Apr. 2016;32(2):301-11. Date of initial pub Feb. 18, 2016.

Wu et al., Implicit and intuitive grasp posture control for wearable robotic fingers: A data-driven method using partial least squares. IEEE Transactions on Robotics. Feb. 2016;32(1):176-86. Date of initial pub Jan. 7, 2016.

Girard et al., A two-speed actuator for robotics with fast seamless gear shifting. 2015 IEEE/RSJ Intl Conf on Intelligent Robots and Systems (IROS). Hamburg, Germany, Sep. 28-Oct. 2, 2015. pp. 4704-4711.

Parietti et al., Design and control of supernumerary robotic limbs for balance augmentation. 2015 IEEE Intl Conf on Robotics and Automation (ICRA). Conf. Seattle, Washington. May 26-30, 2015. pp. 5010-7. Pub Jul. 2, 2015. doi: 10.1109/ICRA2015.7139896.

* cited by examiner

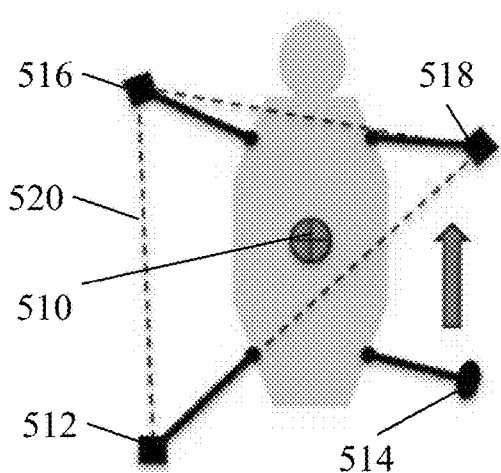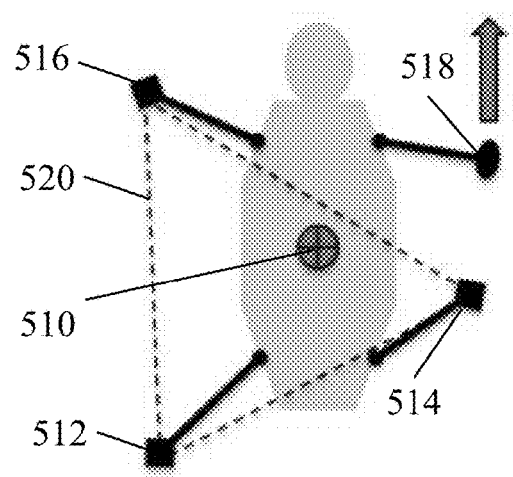
Fig. 5             Fig. 6
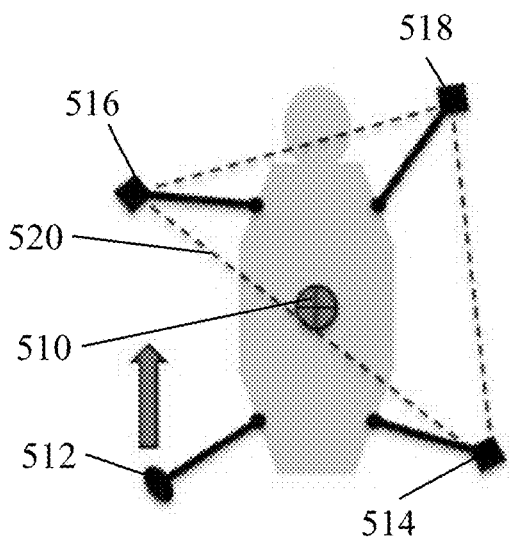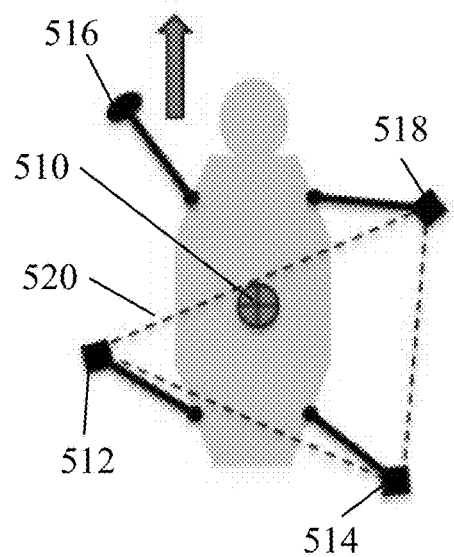
Fig. 7             Fig. 8

ROBOTIC SYSTEMS FOR SUPPORTING A USER

CROSS-REFERENCE TO RELATED APPLICATIONS

This application is claims the benefit under 35 U.S.C. § 119(e) of U.S. provisional application Ser. No. 62/306,139, filed on Mar. 10, 2016, the disclosure of which is incorporated herein by reference in its entirety.

FIELD

Disclosed embodiments are directed to robotic systems and related methods for supporting a user.

BACKGROUND

Workers in a variety of fields often perform manual tasks on or near the floor or ground. Workers also often times use objects placed in low positions relative to the worker's typical standing posture. Examples of such tasks include agricultural and gardening tasks (e.g., harvesting fruits and vegetables which grow near, on, or below the ground), construction tasks (e.g., plastering on the floor, installation of flooring such as floor tiles, etc.), and manufacturing tasks (e.g., welding tasks in the production of heavy machinery, assembly of automobiles and aircraft, etc.). In order to reach the low positions associated with these various types of tasks, and others, the worker has to crouch, kneel down, or otherwise assume another appropriate posture for performing the task. However, this may require a worker to assume a posture that is potentially painful and/or non-ergonomic for long periods of time. Assuming such postures may lead to accelerated worker fatigue, increased worker error, and/or worker injuries, such as injuries to the knees and/or back.

SUMMARY

In one embodiment, a robotic system for supporting a user includes two or more robotic limbs configured to be attached to a user's torso and support the user in a first position, one or more sensors configured to detect movement of the user, and a controller operatively coupled to the two or more robotic limbs and the one or more sensors. In response to the one or more sensors detecting movement of the user away from the first position, the controller controls the two or more robotic limbs to apply a restoring force to the user. The restoring force is directed towards the first position.

In another embodiment, a method of operating a robotic system for supporting a user includes setting a first position for a user supported by a robotic system, the robotic system comprising two or more robotic limbs configured to be attached to the user's torso. The method further includes detecting movement of the user away from the first position, and applying a restoring force to the user with the two or more robotic limbs in response to the detected movement of the user away from the first position. The restoring force is directed towards the first position.

In a further embodiment, a robotic system for supporting a user includes two or more robotic limbs configured to be attached to a user's torso, a user sensor configured to detect a spatial state of the user relative to the two or more robotic limbs, and a controller operatively coupled to the two or more robotic limbs and the user sensor. The controller predicts a user movement based on the spatial state of the user and controls at least one robotic limb of the two or more robotic limbs to move from a first position to a second position based on the predicted user movement.

In yet another embodiment, a method of operating a robotic system for supporting a user includes sensing a spatial state of a user relative to a robotic system, the robotic system comprising two or more robotic limbs configured to be attached to the user's torso. The method further comprises predicting a user movement based on the spatial state of the user, and controlling at least one robotic limb of the two or more robotic limbs to move from a first position to a second position based on the predicted user movement.

In another embodiment, a robotic system includes a harness wearable by a user on at least a portion of the user's torso, a first robotic limb attached to the harness, the first robotic limb extending from a first side of the harness. The robotic system also includes a second robotic limb attached to the harness, the second robotic limb extending from a second side of the harness opposite the first side of the harness. The first and second robotic limbs are configured to support at least a portion of a user's body at a position above a surface. The robotic system further includes a first actuator operatively coupled to the harness and the first robotic limb. The first actuator is configured to move the first robotic limb relative to the harness. The robotic system also includes a second actuator operatively coupled to the harness and the second robotic limb. The second actuator is configured to move the second robotic limb relative to the harness.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIGS. 5-8 are schematic representations of one embodiment of a robotic system being used to aid a user crawling while leaving the user's hands free;

DETAILED DESCRIPTION

Figure 1:
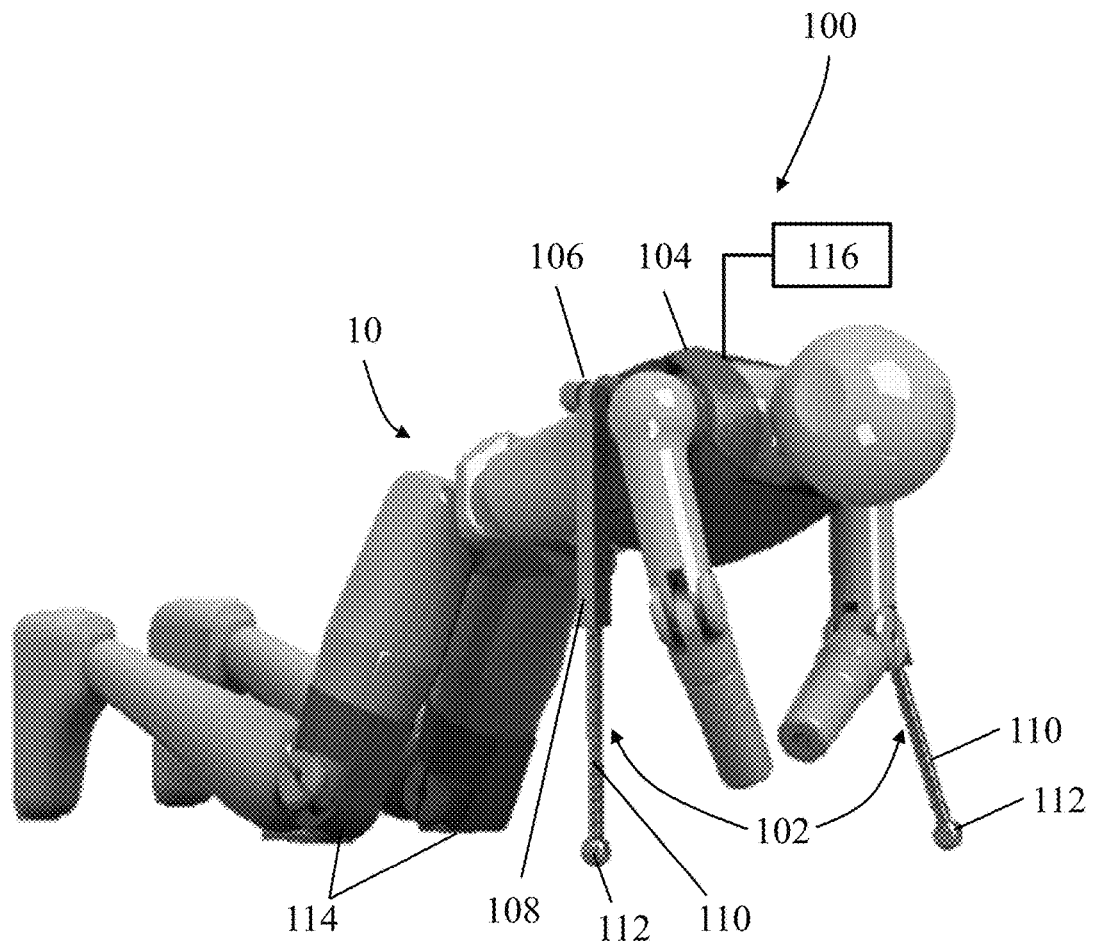
FIG. 1 is a schematic representation of one embodiment of a user supported by a robotic system.

As noted above, workers in a variety of fields may be required to assume a crouched or kneeling position in order to complete manual tasks at positions on or near the ground. For example, many manual tasks may require a worker to assume a kneeling or crouched posture to perform work near the floor or ground. Additionally, in some positions, a worker may be required to use one of his hands for additional support, thereby reducing productivity.

In view of the above, the inventors have recognized that it would be advantageous to use a robotic system to at least partially support a user in a desired position and/or while moving to facilitate the user performing tasks with a desired posture and/or positioning. For example, such a robotic system may allow a user (e.g. a worker) to maintain a more comfortable ergonomic posture with at least a portion of the user's weight supported by the robotic system. Additionally, in some embodiments, the use of such a robotic support system may allow a user to freely use both of their hands to perform a given task.

The inventors have also appreciated numerous advantages associated with a robotic system that supports a user (e.g., a worker) in a kneeling or crouched position such that the user's hands are free to perform a desired task. Unlike conventional dollies or similar structures, which typically only passively support a user in a fixed position, the robotic systems described herein may dynamically support the user in a desired position while allowing the user to move within a desired range of motion in order to accomplish a desired task. Additionally, in some instances, the robotic systems may also assist in transporting the user in a desired direction of travel while maintaining the user in a supported kneeling, crouched, or other appropriate user posture or position, which may allow the user to perform tasks while traveling.

It should be understood that the various embodiments described herein may be controlled in any appropriate manner. For example, in some embodiments, a robotic system may perform functions based on explicit input or commands from a user. However, embodiments in which the robotic systems described herein perform these functions without requiring explicit input or commands from the user are also contemplated. For instance, as detailed further below, in some embodiments, a robotic system may interpret a user's intent based on natural human movements of a user associated with one or more types of motion, such as a crawling motion, and the system may move in response to the determined user intent.

In one embodiment, a robotic system for supporting a user may include a harness wearable by the user on at least a portion of the user's torso. First and second robotic limbs are connected to the harness at any appropriate location relative to the user's torso. The first and second robotic limbs also extend outwards from their connection to the harness such that they extend outwards from the opposing sides of the user's torso when worn. The robotic limbs may also be constructed such that they extend downwards towards, and make contact with the ground, when the user is in the desired position and/or posture to support the user's torso above the ground. In this manner, the first and second robotic limbs may be described as supernumerary robotic limbs (SRLs) which provide support to at the user's torso in place of the support that would normally be provided by the user's hands and arms or other appropriate body portion depending on the particular application. As a result, the user's hands may be free to perform a task while the user's torso is supported by the robotic limbs. As described in more detail below, the robotic limbs may maintain the user's body in a more ergonomic position while providing the above-described support. As described in more detail below, the system may also include one or more sensors to detect data from the user and/or the SRLs, and a controller may control the SRLs to maintain the user in a stable position and/or to move the SRLs in to a desired position in response to the detected data. Moreover, the system may include one or more actuators associated with each of the SRLs to drive movement of the SRLs relative to the harness (and therefore relative to the user) to maintain the user in the stable position and/or to move the SRLs to a new desired position.

For the sake of clarity the embodiments described herein are primarily directed to robotic systems that include two robotic limbs, which in some embodiments may be SRLs. However, embodiments in which three, four, or any desired number of robotic limbs are used to support one or more portions of a user's body are also contemplated as the disclosure is not so limited.

In some embodiments, a user may perform a task generally in a single position or location. This location may correspond to at least a first position. Therefore, the robotic system may support the user in the first position which may either be a position set by a user or it may be a position determined by a controller of the robotic system based on one or more inputs regarding the posture and/or movement of the user. Further, for certain applications, it may be desirable for the user to be afforded a limited range of movement around the first position while performing a task. Accordingly, in some embodiments, a robotic system including two or more SRLs may be controlled to operate in a mode in which the robotic system provides generally stationary support to a user to maintain the user in a first position. Further, the robotic system may allow the user to move within a limited range of motion near the first position. For example, the robotic system may include one or more sensors arranged to detect motion of the user and/or SRLs away from the first position. The robotic system may then apply a restoring force to the user with one or more SRLs in a direction towards the first position. Further, the magnitude of a force applied to the user towards the first position may increase with increasing displacement of a user from the first position. In this manner, the robotic system may urge the user back towards the first position, which in such an application may be viewed as an equilibrium position the robotic system biases the user towards. Thus, the robotic system may maintain the user in a stable, supported position when the user moves away from, and back towards, the user-defined position.

In certain embodiments, a robotic system may feature a tunable movement impedance such that the magnitude of a restoring force applied by the robotic system to a user may be adjusted as desired by a user. For example, in certain tasks, a user may desire a larger range of motion. Accordingly, the user may select a lower movement impedance such that the robotic system provides less resistance (i.e., smaller restoring forces for a given displacement) in response to user movement away from a first position. Further, in some instances, the user may adjust the movement impedance of the robotic system such that the system provides little to no resistance to movement of a user over a certain range of motions. In one such embodiment, the robotic system may apply little to no restoring force to the user for movements away from a desired first position that are less than a threshold distance in one or more directions relative to the first position. This may allow the user to move freely near the first position while remaining supported by the robotic system. Alternatively, the user may select a higher movement impedance such that the robotic system applies larger restoring forces to a user for a given displacement away from the first position to maintain the user closer to the equilibrium position and allows for less movement of the user. For instance, a higher movement impedance may be desirable when the user is performing tasks involving relatively large forces so that the user is not unintentionally moved away from the desired position.

In the above noted embodiment, it should be understood that a movement impedance of a robotic system may be different in different directions. Having different movement impedances in two or more directions may, for example, permit a user to move more freely in certain directions (e.g., side to side) as compared to other directions (e.g., front to back). Additionally, in some embodiments, the movement impedance may vary based on a velocity of a user's movement away from a desired position. For example, faster rates of movement may correspond to the robotic system being controlled to apply larger restoring forces to a user for a given displacement than for the same displacement at a slower rate of movement. In this manner, the robotic system may function in a similar fashion to a tunable spring-and-dashpot system to maintain a user in a desired position.

As noted previously, in some instances, it may be desirable for a robotic system to assist in transporting a user while supporting the user in a crouched or kneeling position. Accordingly, in some embodiments, a robotic system including two or more SRLs may be arranged to operate in a mode in which the robotic system supports a user while assisting with a desired motion, such as a crawling motion, to allow the user to move to a desired location. In one exemplary embodiment, the system may include one or more sensors to detect a spatial state of a user and/or a spatial state of one or more SRLs of a robotic system. As detailed further below, this information may be used by the system to predict a desired movement of the user. For instance, sensors may be provided on the user's knees and/or one or more portions of one or more SRLs. A controller of the robotic system may then predict a desired motion based on movement of the user's knees corresponding to a natural human crawling motion. In response to this detected movement, the controller of the robotic system may control one or more SRLs to move to a new position (e.g., via actuation by a suitable actuator) based on the predicted motion in order to assist with transporting the user while also keeping the user in a stable position.

As used herein, the spatial state of a user may generally refer to information related to the position of the user, the orientation of the user, the stability of the user and the robotic system, and absolute movement of the user and/or movement of the user relative to the robotic system. Again, the robotic system may use one or more sensors associated with one or more portions of the user and/or the robotic system to continuously monitor this information and update the spatial state of the user and/or robotic system. Exemplary portions of a body that be monitored by one or more sensors include, but are not limited to, a user's head, neck, torso, shoulder, elbows, arms, wrists, knees, ankles, or any other appropriate body portion. Appropriate portions of an SRL that may be monitored include, but are not limited to, one or more joints, a foot or end of an SRL, a shaft or other connection extending between two joints, and/or any other appropriate portion of an SRL. A controller associated with the robotic system may then control one or more robotic limbs of the robotic system based on changes to the spatial state, for example, to maintain the user in a stable configuration, or to assist with moving the user to a new desired location.

It should be understood that the robotic systems described herein may be implemented in any number of ways. For example, in some embodiments, a robotic system may engage with a user's torso (e.g., with a harness wearable by the user) only at a ribcage area, and not below the user's waist. In other embodiments, the robotic system may engage with a user's torso in an area between the user's center of mass and the user's head. In certain embodiments, the robotic system may apply forces and/or torques (e.g., a restoring force) to only the user's torso area. In some such embodiments, the robotic system may apply forces and/or torques to only a portion of the user's torso area, such as an end of the user's torso that is closer to the user's head than the user's feet, relative to the user's center of mass. Moreover, in some embodiments, a robotic system may apply forces to a user along specific directions relative to the user's torso, such as along a direction transverse to a direction along which the user's spinal column extends. Of course, other embodiments in which a robotic system applies forces to a user's body in one or more different areas and/or in one or more different directions are also contemplated as the current disclosure is not limited in this fashion. Further, appropriate structures that may be used as a harness for attaching a robotic system to a torso of a user include, but are not limited to, a vest, shirt, jacket, compression sleeve, climbing harness, other strap arrangements, and/or any other appropriate configuration as the current disclosure is not limited in this regard.

As noted above, a robotic system may include one or more sensors to measure data related to a positional state of a user or the various components of the robotic system. Depending on the particular embodiment, the type of data collected by the sensors may correspond to any number of different types of position, acceleration, velocity, orientation, applied force, and/or applied pressure associated with any appropriate body portion of a user and/or any portion of an SRL or robotic system. For example, in one embodiment, the various sets of sensors associated with a user or a robotic system may sense linear and/or rotational accelerations relative to at least one axis, and in some embodiments, relative to two or three separate axes. Additionally, in some embodiments, the sets of sensors may sense linear and/or rotational velocities relative to at least one axis and/or two or three separate axes instead. Further, in yet another embodiment, the sets of sensors may sense orientation, such as a magnetic orientation, relative to one axis and/or two or three separate axes. However, embodiments in which the sets of sensors sense linear accelerations, rotational velocities, and/or orientations are also contemplated. In one such embodiment, the first and second sets of sensors may both include a triaxial accelerometer, a triaxial gyroscope, and/or a triaxial magnetometer such as may be present in a typical inertial measurement unit (IMU) or other appropriate sensing device. In certain embodiments, multiple IMU sensors may be provided at various locations on a user and or on a robotic limb to determine a spatial state of the user and/or the robotic system. Other appropriate sensors that may be used include, but are not limited to, velocimeters, proximity detectors, pressure sensors, force sensors, rotary encoders, strain gauges, extensometers, linear voltage displacement transducers, image based sensing systems, and/or any other appropriate sensor capable of measuring a desired physical parameter in one, two, three, or any number of separate axes.

While several different types of sensors and data for sensing the movements and/or orientations of body portions are described above, it should be understood that any type of sensor capable of measuring a physical quantity that may be used to determine the orientation, movement, and/or relative positioning of portions of a user's body, the noted robotic limbs, and/or other portions of a robotic system may be used as the current disclosure is not limited in this fashion.

In some embodiments, it may be desirable to support a user in a stable position. Therefore, in some applications, a robotic system may be operated to maintain a center of mass of the combined system of a user and the robotic system within a stability area corresponding to at least three points of support that apply force to a supporting surface, e.g. a portion of a user's body and/or an SRL in contact with the ground. Therefore, the robotic system may gather force and position data using one or more sensors (e.g., the one or more sensors used to determine a spatial state of a user noted above) in order to determine a stability area of the combination of the user and robotic system. As used herein, a stability area refers to a projected area on a supporting surface that corresponds to a stable configuration of the user and robotic system as long as the center of mass of the combined user and robotic system is maintained within the area. For example, in the case of a user supported by two SRLs and the user's two knees (e.g., while in a stationary working position), the stability area would be defined by a polygon with vertices at each of the locations where the SRLs and the user's knees contact the surface above which the worker is supported. As long as the center of mass of the user and robotic system remain within the stability area (shaped as a quadrilateral in this example), the user will remain supported and balanced by the robotic system. As another example, when a user is moving one of his knees as part of a crawling motion, the stability area would be defined as a triangular area with vertices at the user's other knee and the two SRLs. A robotic system may monitor these contact points with the ground using pressure, force, and/or contact sensors located on a portion of a user's body and/or an SRL that contacts the supporting surface. For example, these sensors may be located in knee pads worn by a user and in line with a load bearing portion of an SRL such as a joint, foot, shaft, or other appropriate portion of an SRL.

While supporting a user, a robotic system may monitor the position of the user relative to the boundaries of a defined support area. If the system determines that the center of mass of a user, or the combined center of mass of a user and robotic system, is approaching the boundary, the system may control one or more of the SRLs to either bias the center of mass towards an interior of the support area and/or change the support area to accommodate the movement of the center of mass. For example, a robotic system may bias a center of mass towards an interior of a support area by applying an appropriate restoring force to the user. Alternatively, one or more of the SRLs may be moved to a new location to define a new stability area with the center of mass within the new stability area. In this manner, a robotic system may support a user while also maintaining a balance of the combined system.

In some embodiments, movement of a user's center of mass relative to a boundary of a stability area may be used to control one or more aspects of a robotic systems operation. For example, in one embodiment, while operating in a stationary mode (i.e., maintaining a user at a desired position), a robotic system may detect motion of the user's center of mass towards the stability area boundary as an indication that the user desires to transition to a dynamic mode for moving to a to a new location. In other instances, the system, while operating in a dynamic mode, may detect that the user's center of mass has stopped moving relative to the boundary of the stability area as an indication that the user desires to transition to a stationary mode. Of course other applications of the relative movement of a user's center of mass relative to a support area to control operation of a robotic system are also possible as the disclosure is not so limited.

In addition to the above, in some embodiments, a robotic system may be adjustable to support a user in at least a first and second position, and in some embodiments, a range of positions between the first and second position. For example, a robotic system may be adjustable between a lowered position (e.g., corresponding to a kneeling or crawling position), and a standing position of a user. Additionally, the system may be adjustable between two, three, or any number of positions. Alternatively, the robotic system may be continuously adjustable between these various positions. Additionally, in some embodiments, a robotic system may be adjustable during use, e.g. through the use of one or more actuators that adjust a length or position of one or more SRLs, such that the system may assist a user in transitioning between the first and second positions (e.g. a standing position and a lowered position). Alternatively, the robotic system may include SRLs that may not be dynamically variable between the two positions as the disclosure is not limited in this fashion.

It should be understood that the robotic systems described herein, including the robotic limbs, are not limited to any particular structure or configuration. For example, in certain embodiments, one or more robotic limbs (i.e., SRLs) may attach to a harness at respective actuated shoulder joints having two rotational degrees of freedom. As described in more detail below, such actuated shoulder joints may feature various configurations for actuating the robotic limbs in different directions. Moreover, in some embodiments the robotic limbs may have a telescoping configuration to allow the length of the robotic limbs to be adjustable. For instance, the limbs may feature a passive telescoping configuration, with an internal spring to control the length of the limb in response to variations in the load applied to the limb. In other, embodiments, the robotic limbs may include an actuated telescopic configuration in which the limb actively extends and contracts. Alternatively, the robotic limbs may not be telescopic at all. For example, the limbs may have a fixed length or may have an articulating structure, as the current disclosure is not limited in this regard.

As noted above, the robotic systems described herein may receive input from a user in a one or more distinct ways. For instance, in some modes of operation, a user may provide instructions to the robotic system via the user's natural motions, such as those associated with crawling movement, or movement of a user away from a user-defined equilibrium position. In other modes of operation, the robotic system may receive explicit instructions from the user, such as via gestures (i.e., deliberate user movements that are distinct from the natural motions noted above), voice commands, or by the user physically interacting with the robotic system via a suitable interface. Accordingly, it should be understood that the current disclosure is not limited to any particular methods by which a user controls or interacts with a robotic system.

Turning now to the figures, several nonlimiting embodiments are described in further detail in reference to the figures. While specific arrangements and combinations of features are detailed herein, it should be understood that the current disclosure is not limited to only the depicted embodiments. Instead, the current disclosure encompasses any suitable combination of the various features and embodiments described herein as the present disclosure is not limited in this respect.

FIG. 1 depicts a schematic embodiment of a user 10 supported by a robotic system 100. In the depicted embodiment, the robotic system includes two robotic limbs 102 extending outwards from opposing sides of a harness 104 worn by the user. In this embodiment, the harness 104 is depicted as a vest wearable on an upper portion of the user's torso. However, it should be understood that other harness configurations also may be suitable including for example, a shirt, jacket, compression sleeve, climbing harness, other strap arrangements, and/or any other appropriate configuration as the current disclosure is not limited in this regard. Each robotic limb 102 is attached to the harness 104 at an actuated joint 106 (e.g., a shoulder joint) located on a back of the user, though embodiments in which the robotic limbs are attached to a side or front of the user's torso are also contemplated. While only one actuated joint 106 is depicted in FIG. 1, it should be understood that a second actuated joint is included on the opposite side of the harness for attaching the second robotic limb to the harness. In the depicted embodiment, each of the robotic limbs includes a first portion 108 and a second portion 110. In some embodiments, the second portion telescopes relative to the first portion such that the lengths of the robotic limbs 102 are independently adjustable. Therefore, as depicted in the figure, the first portion 108 is attached to the actuated joint 106, while the second portion 108 extends from the first portion and terminates at a foot 112 that is configured to contact a surface (e.g., the ground) above which the user is supported.

Depending on the particular embodiment, the telescopic configuration of the robotic limbs 102 may have any suitable structure to allow for adjustment of the length of the limbs. For example, the limbs may feature a passive construction including a compliant element (e.g., a spring) located within the first portion 108 that biases the second portion 110 outwards. Thus, the robotic limb may dynamically change length in response to changes in the load applied to the leg as may happen as a result of the user moving or performing a task. Alternatively, in some instances, the limbs may include one or more actuators associated with the second portion of the robotic leg, not depicted. These one or more actuators may then be controlled to actively control the extension and/or retraction of the second portion of the robotic leg relative to the first portion of the robotic leg to control an overall length of the robotic leg. Such a configuration may be used to actively control a robotic leg length in response to user movement and/or to assist in positioning the user in a desired posture and/or positional state.

While telescoping robotic legs are noted above, it should be understood that embodiments of robotic systems including non-telescoping robotic leg configurations are also contemplated, as the disclosure is not limited in this fashion. For example, a robotic limb may feature an articulated structure, or may simply have a fixed length.

In the embodiment depicted in FIG. 1, the actuated joints (e.g., joints 106) have two rotational degrees of freedom. Specifically, the actuated joints are configured to rotate the robotic limbs about a first axis extending generally outwardly from the users torso in order to rotate the limbs within a plane parallel to a sagittal plane of the user (i.e., to rotate the limbs along the length of the user's torso). The actuated joints are also configured rotate about a different second axis, which may be perpendicular to the first axis. This rotation about the second axis may be used to rotate the robotic limbs within a plane generally parallel to a frontal plane of the user (i.e., to rotate the limbs towards and away from the user's torso). In this manner, actuation of the robotic limbs via the actuated joints can be used to apply forces and/or torques to the user in a front to back, side to side, and or other orientations in order to maintain the user in a desired position and/or to move the robotic limbs to a desired position.

Referring again to FIG. 1, the robotic system 100 may further include one or more sensors 114. In the depicted embodiment, two sensors 114 are integrated with two knee pads that are wearable by the user. However, as previously noted, the sensors may be associated with other body portions as well including, but not limited to a head, neck, torso, shoulder, elbows, arms, wrists, knees, ankles, or any other appropriate body portion. Additionally, sensors may be integrated with a robotic system at a number of various locations such as on the harness 104, within the actuated joints 106, various locations along the robotic limbs 102, within the telescoping limb portions 108 and 110, with the feet 112 of the limbs, or any other appropriate portion of a robotic system. As noted previously, any number of different types of sensors may be used to determine a desired physical parameter of a user and/or robotic system. However, in some embodiments, the various sensors associated with one or more portions of a user's body may be inertial measurement units (IMUs) that can measure position, orientation, and acceleration of the associated body portion along multiple axes. Of course, embodiments in which a robotic system includes multiple types of sensors are also contemplated. For instance, IMUs may be used to measure the movement and orientation of a user's knees, the amount of compression of a spring within a telescopic robotic limb may be sensed with an extensometer to determine the axial force acting on the limb, and one or more rotary encoders associated with the one or more rotational joints of the robotic limb may be used to measure an orientation and/or configuration of the robotic limb. Of course, it should be understood that the current disclosure is not limited to any particular type of sensors or combination thereof.

A robotic system 100 may further include a controller 116 operatively coupled to the various components of the system, including the various sensors 114 associated with a user and/or the robotic system as well as the various actuated joints including, for example, the actuated shoulder joints 106. The controller may use data received from the different sensors to monitor a position, orientation, and/or movement of the user (e.g., the center of mass of the user's torso) as well as the robotic limbs. As detailed further below, the controller may use this sensor data to control the actuation of the robotic limbs 102 via the actuated shoulder joints 106 in response to changes in the user's position in the different modes of operation. As explained below, the controller 116 may be implemented in any suitable manner, and may communicate with the sensors 114, the actuators in the actuated joints 106, and/or any other portion of the robotic system via any suitable wired or wireless communication protocol.

FIG. 1 also illustrates how a robotic system 100 may support the user 10 in an ergonomic position in which the user's hands are free to perform a given task. For instance, an ergonomic position may be one in which an angle formed by the user's knees is larger (i.e., more open) compared to a conventional crouching or kneeling position that a user may adopt without support from the robotic system. Additionally, the ergonomic position may be one in which the user's torso is supported such that the user's spine remains in an aligned posture, rather than a more hunched or slouched posture, which may be less comfortable for the user. Moreover, the robotic system may, in some embodiments, be arranged to support a substantial portion of the user's weight such that the load on the user's lower body (e.g., the user's knees) is reduced. For example a robotic system may be configured to support greater than or equal to 50%, 60%, 70%, or any other appropriate percentage of a user's weight. Correspondingly, a robotic system may be configured to support greater than or equal to 50 lb, 100 lb, 200 lb, 300 lb, or any other appropriate weight on one or more robotic limbs to enable it support a user's weight.

As discussed above, a robotic system (such as the system 100 shown in FIG. 1) may, in some instances, be operated in a mode to support a user at a first position such that the user may perform a desired task at a desired location. This position may be a user-defined position and/or a controller of the robotic system may determine when a user intends to remain stationary based on one or more sensed inputs regarding the user's spatial state. Additionally, the robotic system may be configured to allow the user to move within a limited range of motion near the first position, and the system may be set with a desired movement impedance to apply a restoring force to the user when the user moves away from the first position. As noted above, the robotic system may act like a virtual spring and dashpot system, and thus the restoring force may be a function of both the user's position relative to the first position and the user's velocity velocity as the user moves away from the first position.

Figure 2:
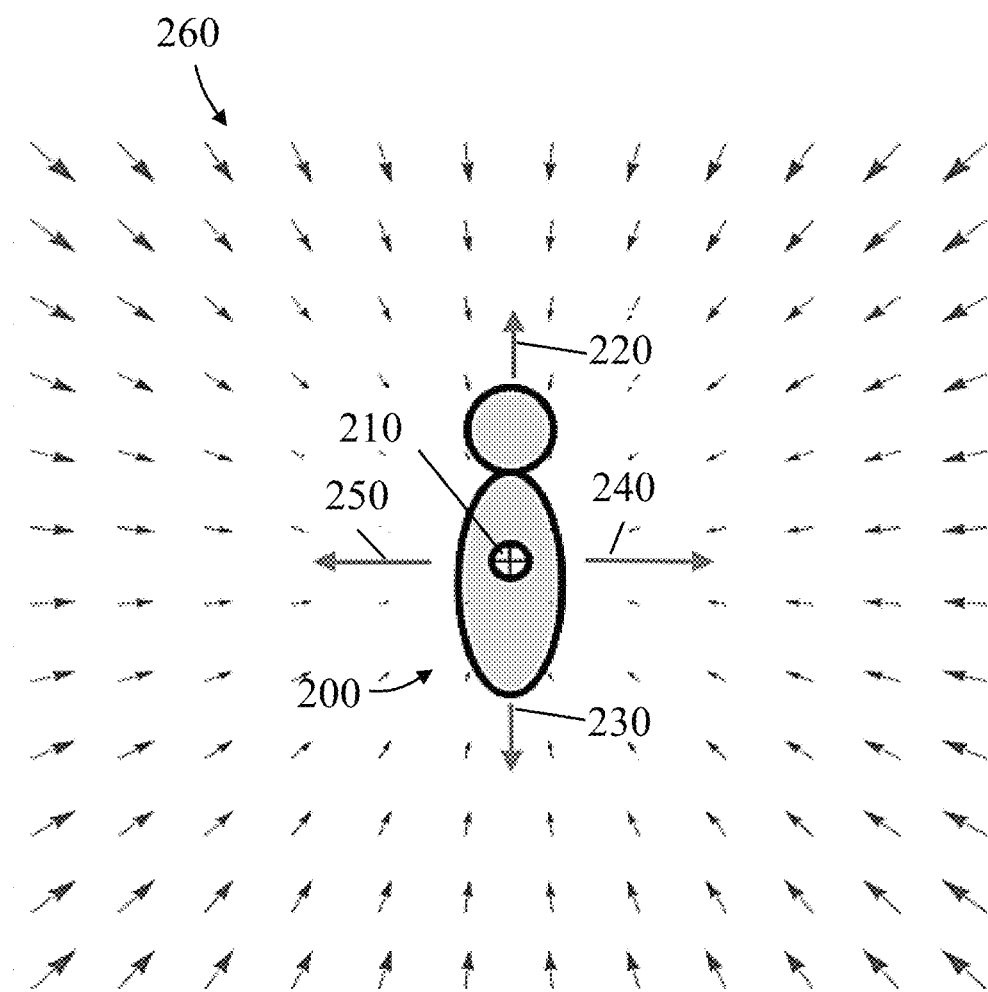
FIG. 2 is a schematic representation of restoring forces applied to a user versus distance from a desired position.

FIG. 2 depicts a schematic representation of a user 200 using a robotic system (not depicted) in a static or stationary mode of operation as noted above. In particular, FIG. 2 depicts the user 200 with the user's center of mass 210 located at a first position. In that position, the robotic system supports the user without applying any additional forces to the user. When the user moves away from the first position, for example, along a forward direction 220, backwards direction 230, right direction 240, left direction 250, or a combination thereof, the robotic system applies a restoring force that biases a user towards the first position as depicted by the field of arrows 260. Further, a magnitude of the restoring force towards the first position may increase with increasing displacement of the user away from the first position as indicated by the increasing length of the arrows away from the first position. In this manner, the robotic system may support the user at a desired position while also allowing the user to move within a limited range of motion. For example, in one embodiment, the user may have a range of motion that is between or equal to 10 cm and 20 cm, 20 cm and 30 cm, or any appropriate range of distance in any direction from the first position, though the current disclosure is not limited to any particular range of motion.

Although FIG. 2 generally depicts the magnitude of the restoring force increasing uniformly in all directions away from the first position, it should be understood that the movement impedance of a robotic system operated in a stationary or static mode may be adjusted as desired to provide any suitable relationship of restoring forces to various types of displacements. As one example, the movement impedance may be set such that the restoring forces are small for movements along directions 240 and 250 (i.e. movements in a side to side direction relative to a user's torso when supported by the robotic system), but larger for movements along directions 220 and 230 (i.e. movements in a forwards or backwards direction relative to a user's torso when supported by the robotic system). With such an impedance configuration, the user may be free to move from side to side, but more restricted when trying to move front to back. Of course, other movement impedance configurations are also contemplated, as the current disclosure is not limited to any particular movement impedance configuration or arrangement of restoring forces. Additionally, while user motion and restoring forces are depicted within a two-dimensional plane, it should be understood that the disclosure is not so limited, and the robotic system may be configured to apply a restoring force towards the first position in response to user movement in any three-dimensional translational and/or rotational direction away from the first position including movements of a user towards and away from a supporting surface.

Figure 3:
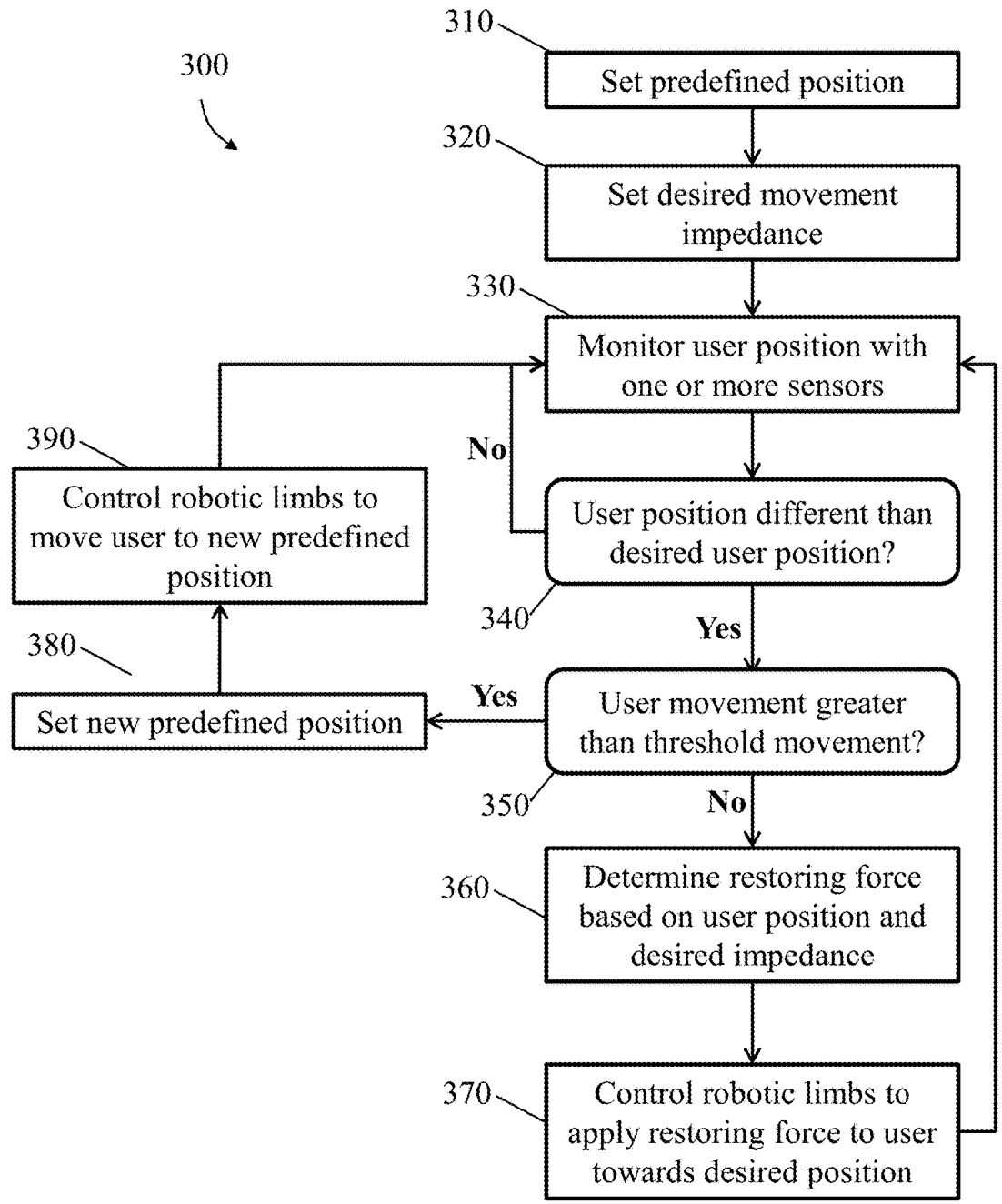
FIG. 3 is a flow diagram of one embodiment of a method of operating a robotic system to maintain a user at a desired position.

FIG. 3 is a flow diagram 300 detailing one embodiment of a method of use of a robotic system to support a user at a first predefined position. At 310, a user may set a desired first predefined position (i.e., a user-defined position) using any appropriate type of user input. Alternatively, a controller of a robotic system may determine from one or more sensor inputs that movement of the user relative to a current user position is less than a predetermined threshold to determine when a user desires to remain in a stationary or static state. The controller may then automatically set the first predefined position. At 320, the user may also set a desired movement impedance of the system. As discussed above, setting the desired movement impedance may include setting a desired restoring force response for the system for user movement in different directions, for different rates of movement, and/or for different ranges of motion. However, if the user does not wish to change the movement impedance characteristics of the system, setting the desired movement impedance at 320 may simply correspond to leaving the movement impedance unchanged. Alternatively, in some embodiments, a robotic system may not permit a user to change the movement impedance characteristics of the system as the disclosure is not limited in this fashion.

At 330, the robotic system monitors the user position using one or more sensors, and at 340, the system determines whether the user has moved away from the desired position. If the system does not detect any user movement away from the predefined position, the system may continue to monitor the user position and check for movement at 330 and 340. If the system does detect movement away from the predefined position, the system may then determine if the movement exceeds a threshold movement relative to the predefined position at 350 (described in more detail below). If the movement does not exceed the movement threshold, the system determines the restoring force at 360 based on the desired movement impedance characteristics, and subsequently controls the robotic limbs of the system to apply an appropriate restoring force to the user at 370 in order to bias the user back towards the predefined position. The system then continues to monitor the user position at 330.

To help avoid a user's supported position from becoming unstable, as noted above, a controller of a robotic system may determine if a user movement away from a predefined position exceeds a movement threshold. For example, such a movement may cause the system to lose balance and become unstable if the user's position moves beyond the movement threshold. Alternatively, the detected movement may be an indication that a user desires to move to a new location. In either case, if at 350 the system detects that a user movement exceeds a movement threshold, the system then sets a new second predefined position at 380 and controls the robotic limbs to move the user to the new desired position at 390. Once at the new desired position, the system continues to monitor the user position at 330 as previously described. Additional details related to the implementation of the above described system and methods are provided below.

Figure 4:
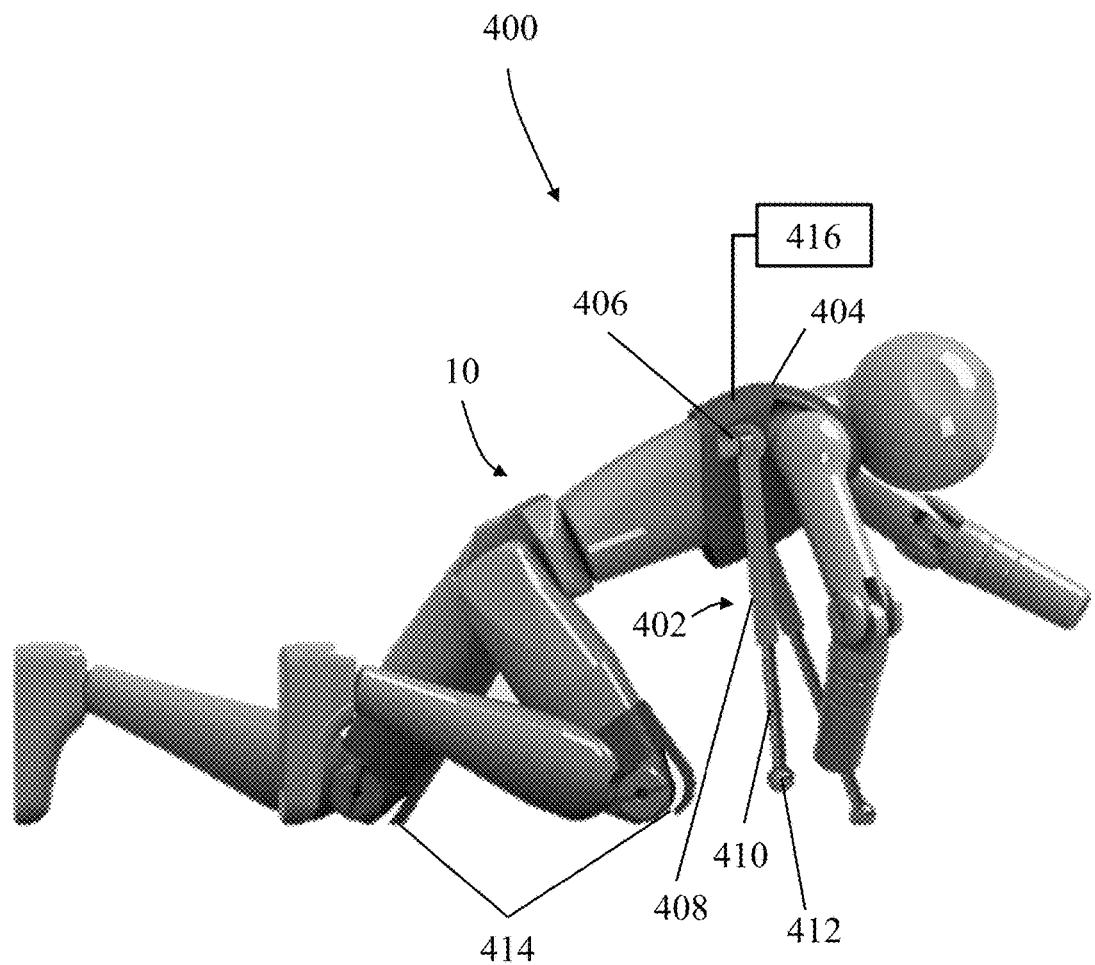
FIG. 4 is a schematic representation of a one embodiment of a robotic system including sensors.

As discussed previously, in addition to supporting a user in a first predefined position, in some modes of operation, a robotic system as described herein may be operated to assist in transporting a user to different locations while at least partially supporting the user. For example, a robotic system may support a user in a near-ground position such as a crouched or crawling position, though embodiments in which a robotic system supports a user in a standing, or other appropriate type of position, are also contemplated. For example, FIG. 4 depicts one embodiment of a user 10 operating a robotic system 400 in a dynamic crawling mode. Similar to the embodiment shown in FIG. 1, the robotic system 400 includes a pair of robotic limbs 402 that are attached to, and extend outwards from opposing sides of, a harness 404 via actuated joints 406. Each of the limbs 402 features a telescopic construction with a first portion 408 attached to the actuated joints 406, and a second portion 410 that telescopes out from the first portion. A foot 412 is located at a distalmost end of the robotic limb opposite the end of the robotic limb attached to the harness. The system may also include one or more sensors 414 (shown on the knees of the user in this embodiment) and a controller 416 which controls the limbs 402 based on data received from the sensors 414. For example, as illustrated in FIG. 4, the robotic controller 416 may detect user movement, such as movement of one of the user's knees, a pressure or force applied to the knees, and/or other appropriate information related to a positional state of a user. The controller may then actuate one or more of the robotic limbs 402 in response to that detected user position state. For example, as detailed further below, the controller 416 may control the limbs 402 to mimic a natural crawling movement of the user in response to sensed movements of the user's knees relative to the robotic limbs of the robotic system, though other movement modes are also contemplated as the disclosure is not limited to any particular type of user movement.

As previously described, while a user is supported by a robotic system, including while the user is stationary (i.e., supported in a predefined position) and while the user is moving between positions, a robotic system may use data from one or more sensors to calculate a stability region within which the user and robotic system will remain stable and balanced while the user's center of mass is maintained within the stability region. FIGS. 5-8 depict a schematic representation of a robotic system at different stages of a crawling motion. Further, these figures illustrate one embodiment of how a robotic system maintains the center of mass of the user within a stability area. In this example, the three or more points in contact with the ground, or other supporting surface, during a crawling motion of the user define the vertices of the stability region, which in this embodiment is a triangular region. Specifically, the user's knees are shown as points 512 and 514, while the feet of the robotic limbs are shown as points 516 and 518. In each figure, the stability area 520 is defined by the points that are in contact with the surface and therefore supporting the user. In each of the figures, the user's center of mass 510, and/or a combined center of mass of the robotic system and user, is maintained within the stability area 520. Therefore, this maintains the user and robotic system in a stable configuration during all stages of movement. Although a triangular stability area is depicted in the figures, it should be understood that a stability area may have other shapes, such as a quadrilateral shape when all four points are in contact with a surface and supporting the user, or other higher order polygons for systems including more than two robotic limbs or in cases in which other portions of the user's body (e.g., the user's feet or hands) are also supporting the user.

In the above embodiment, a controller of a robotic system may determine which points are in contact with a surface using one or more sensors that are capable of detecting a force or pressure applied to one or more portions of a user's body and/or the robotic limbs in contact with the ground. Additionally, in some embodiments, a particular contact point may only be considered as a vertex in a determined stability region if the sensed force or pressure, or other related quantity (e.g. a sensed compression or extension of a spring) is greater than a threshold force or pressure indicating that the robotic limb and/or body portion is actively supporting the user.

FIGS. 5-8 also depict the control of the robotic limbs 516 and 518 of a robotic system to facilitate a crawling motion of a user while maintaining a stable configuration of the combined user and robotic system. In FIG. 5, the first robotic limb 516 and first user knee 512 are on a left side of the user and are located in a forward and rear position respectively. The second robotic limb 518 and second user knee 514 located on the opposing right side of the user are both in rear positions with a stability region defined between the first robotic limb and user knee and the second robotic limb. The user's second knee is then taken out of contact with the ground and moved forward from a rear position to a forward position towards the second robotic limb, see FIGS. 5 and 6. Once the user's second knee is placed in contact with the ground, the second robotic limb is taken out of contact with the ground and moves from the rear position to a forward position while the first robotic limb and the user's second knee are moved backwards to their associated rear positions while still in contact with the ground, see FIGS. 6 and 7. The user then takes the first knee out of contact with the ground and moves the first knee in a forward direction towards a forward position and the first robotic limb while the second robotic limb is moved in a backwards direction towards the rear position, see FIGS. 7 and 8. The first robotic limb may then be moved in a forwards direction towards the forward position while the user's first knee is moved in a backwards direction towards the rear position resetting the combined user and robotic system to the initial state described above, see FIGS. 8 and 5.

While the above embodiment describes taking the robotic limbs and user knees out of contact with the ground, embodiments in which the robotic limbs and/or a user's knees maintain contact with the ground, but a force supported by the robotic limbs and/or the user's knees, is simply reduced are also contemplated as the disclosure is not so limited. For example, a telescoping robotic limb may maintain contact with the ground while it is moved in a forward or backwards motion, but the weight supported by the leg during this movement may be reduced during one or more portions of a movement cycle. Additionally, the forward and rear positions noted above are taken relative to the center of mass of a user as they move. Therefore, when a particular robotic limb and/or portion of a user moves to a forward or rear position, the absolute position of the robotic limb or portion of the user may not change, but the positioning of that robotic limb or portion of the user relative to a center of mass of the user may change and is what is referenced above.

In some embodiments, a controller of a robotic system may monitor the position of a user's center of mass relative to the boundary of a stability area and use the relative position to determine how to suitably control the robotic arms. For example, in a stationary configuration, the system may apply a greater restoring force to the user when the center of mass nears the stability area boundary to keep the user in a stable configuration while maintaining the user at a predefined position. Additionally, in some instances, the system may detect center of mass motion towards (or past) the stability region boundary as an indication that the user desires to move to a new location, thereby defining a new center of mass position and a new stability region.

As discussed previously, a controller of a robotic system may use data received from one or more sensors to determine a spatial state of the user and/or the robotic system. Such data may be position data, orientation data, velocity data, acceleration data, force data, pressure data, torque data, data related to movement of a user's center of mass relative to a stability area boundary, or any other appropriate form of data. Additionally, the data may be measured using any suitable type of sensor. For instance, data regarding motion of the position and movement of a user's knees may be gathered from one or more IMUs and/or force sensors provided in a kneepad wearable by a user. Of course, other sensor combinations, configurations, and sensor locations are also contemplated as the disclosure is not limited in this regard.

Figure 9:
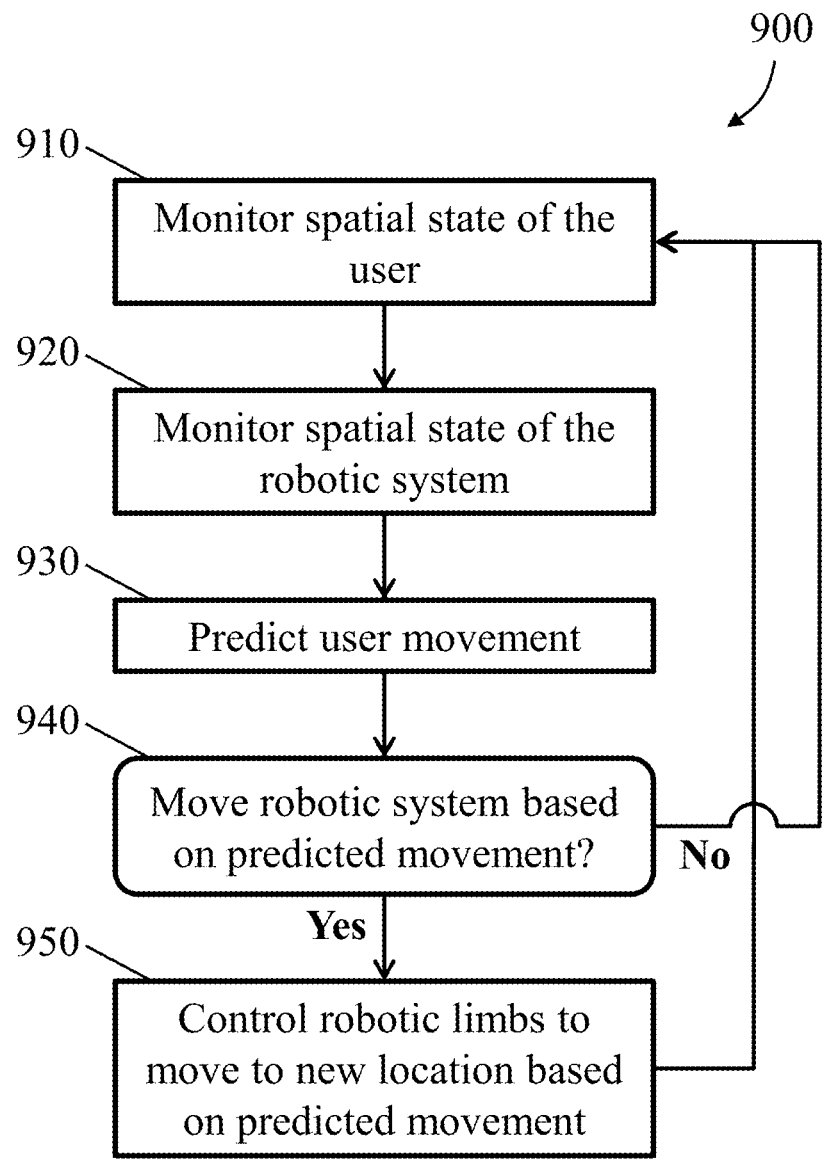
FIG. 9 is a flow diagram of one embodiment of a method of operating a robotic system to move a user based on a predicted movement.

Referring now to FIG. 9, an exemplary flow chart 900 is shown detailing one embodiment of a method of using a robotic system to assist in transporting a user. At 910 and 920, the system monitors the spatial state of the user and robotic system respectively as previously described. The system then uses the data related to these two spatial states to predict a user movement at 930. For instance, a change in the user's spatial state, such as movement of the user's knee consistent with a crawling movement, may result in the system predicting that the user is attempting to crawl in a particular direction. Based on the predicted user movement, the system then determines at 940 whether the robotic system (e.g., one or more robotic limbs) needs to be moved in order to accommodate the predicted user movement as detailed previously in regards to FIGS. 5-8. Alternatively, if the system determines that the predicted user movement would move the user's center of mass beyond the boundary of the stability area, the system may determine that the robotic system should move one or more of the robotic limbs to maintain a user's center of mass within a stability region. In either case, once the system determines that one or more of the robotic limbs should be moved, the system may control the robotic limbs at 950 to move the limbs to a new location. The system may then continue to monitor the spatial state of the user at 910 and robotic system at 920 until additional movement of a user is predicted. If no movement of the robotic system is needed at 940, the system may remain stationary and continue monitoring of the spatial states of the user and robotic system until the system does predict a user movement and/or the system exits this mode of operation.

Figure 10:
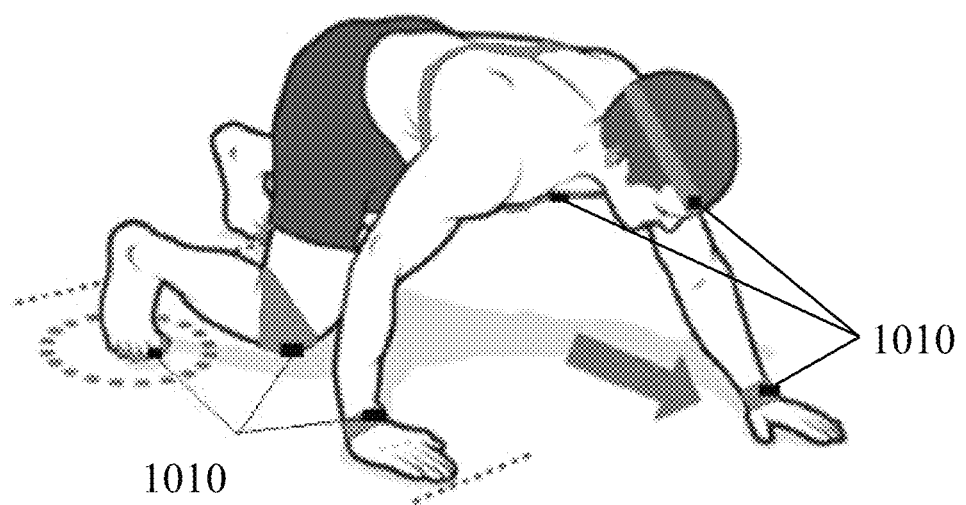
FIG. 10 is a schematic representations of locations where sensors may be positioned relative to a user's body portions.

To facilitate controlling a robotic system during different types of user motion, in some of the above embodiment, a robotic system may use natural human motion data in order to predict a user movement and move one or more robotic limbs accordingly. FIG. 10, for instance, depicts one example of how human crawling motion data may be gathered for use with a predictive algorithm in a robotic system. In this example, multiple sensors 1010, such as IMUs and/or force sensors are placed at various locations on a user's body and the spatial state of the wearer is monitored as the wearer undergoes a natural crawling motion. This data can be used with known machine learning methods, such as a Partial Least Squares Regression (PLSR) algorithm or Support Vector Machines (SVM) algorithm, in order to build a model that can predict a user's intended movement based on measured spatial state data. Although FIG. 10 shows a user performing a crawling motion to generate data for a model, it should be understood that the methods described herein also may be suitable for other types of motion, such as motion related to moving from a crawling position to a standing position, walking, and/or any other desired type of user motion. Accordingly, it should be understood that the current disclosure is not limited to models related to any specific type of human motion.

Figure 11A:
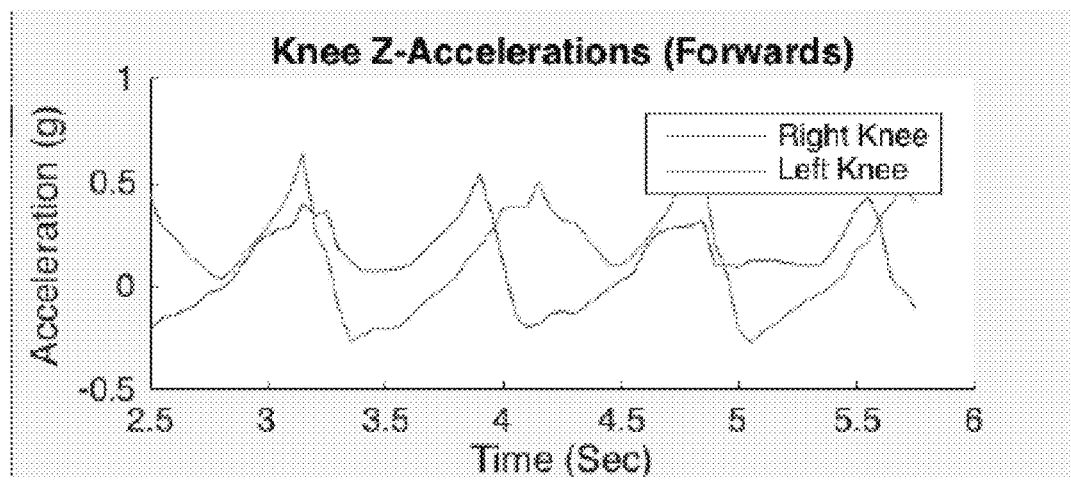
FIG. 11A is a graph of measured knee accelerations.
Figure 11B:
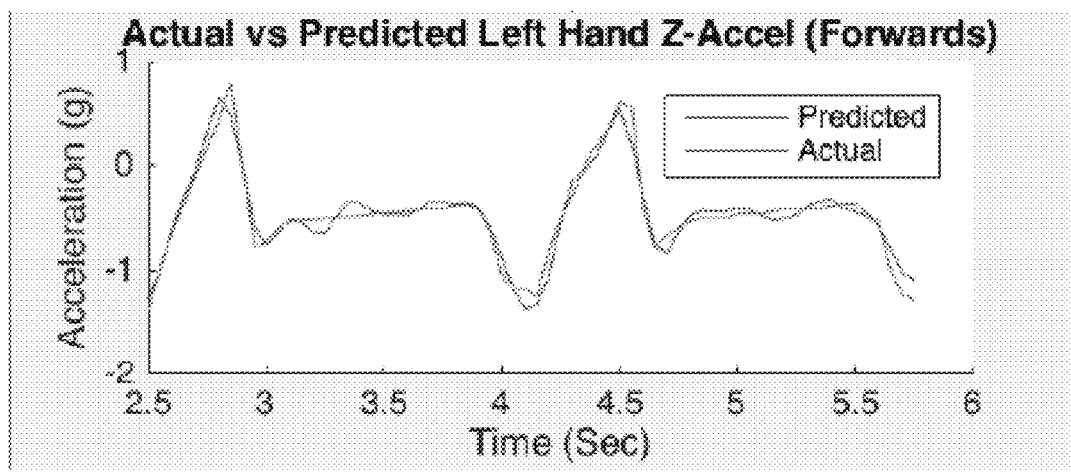
FIG. 11B is a graph of actual versus predicted accelerations based on the measured knee accelerations of FIG. 11A.

With both PLSR and SVM methods, large amounts of spatial state data (e.g., force and motion data) may be collected from subjects crawling naturally (i.e., without assistance from a robotic system), or otherwise moving in a particular type of movement cycle. Models may then be created using that data as a training set in order to generate predictions of the trajectories of certain body parts (e.g., hands or arms) based on motion of other body parts (e.g., knees). For example, FIGS. 11A and 11B depict results based on one set of experimental data and results from a PLSR model for a person crawling. In particular FIG. 11A plots a time series of the measured accelerations of a user's right and left knees (i.e., input data in the model). FIG. 11B then plots the actual acceleration of the user's left hand as well as the acceleration predicted by using a model derived from the measured data. As shown in the figure, the model is able to accurately predict the motion of the user's hand based on the motion of the user's knees. Using this or other similar types of models, a controller in a robotic system may accurately determine where to move a robotic limb in response to movement by a user to mimic the natural movement of one or more portions of a user's body during a particular type of motion cycle.

Figure 12:
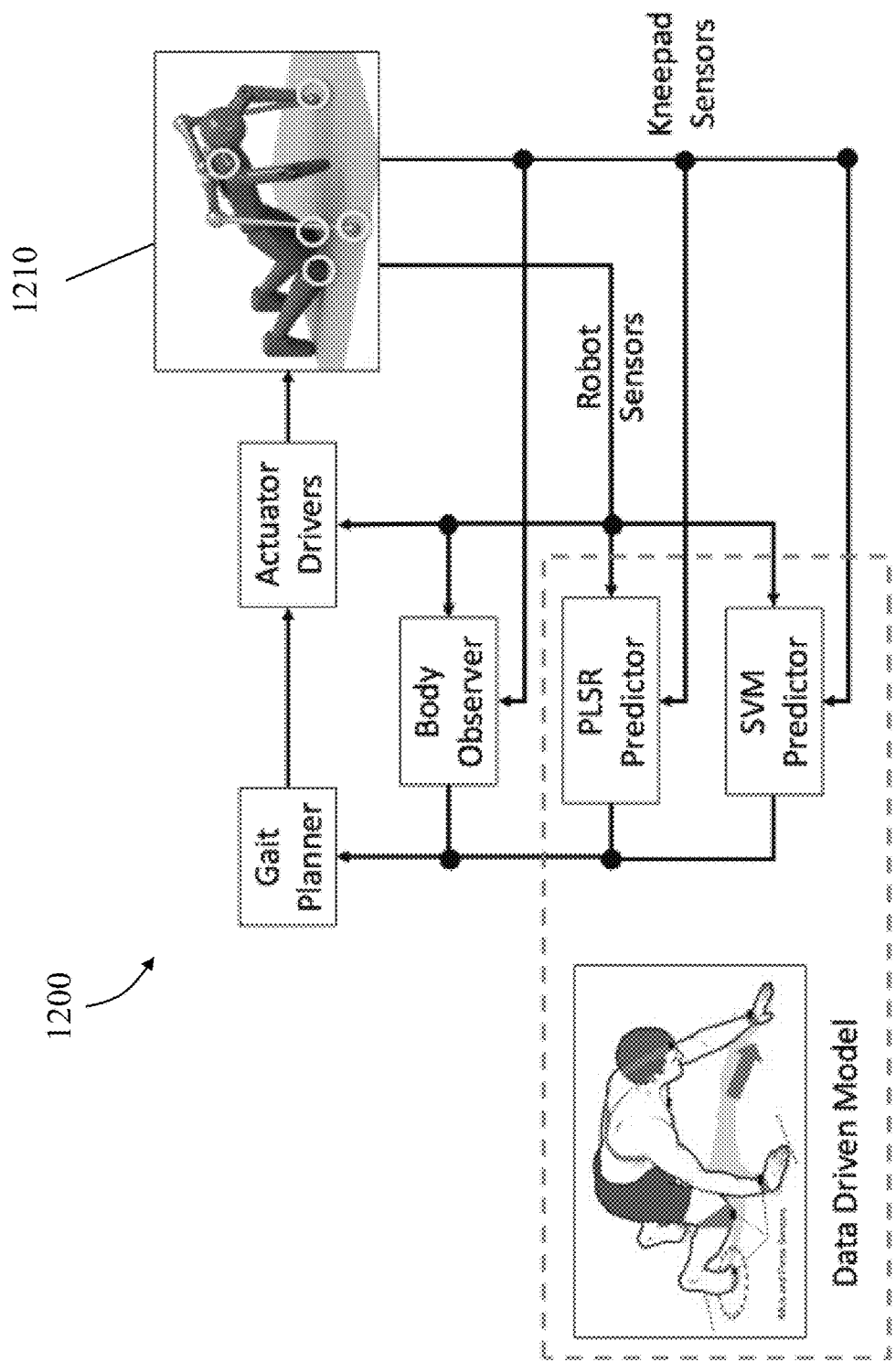
FIG. 12 is a schematic representation of one embodiment of the controllers of a robotic system.

Referring now to FIG. 12, one exemplary embodiment of a control scheme for a robotic system is depicted including one or more predictive models to assist with user motion. In this embodiment a robotic system is shown schematically at 1210. As previously described, the robotic system may include two or more robotic limbs attached to a user, as well as a plurality of user sensors (i.e., kneepad sensors) and robot sensors. The robotic system includes a controller. The controller may include a body observer module, a gait planner module, and/or one or more predictor modules based on data driven models (such as the PLSR and/or SVM modules discussed above). In particular, the body observer module may monitor the spatial state of the user and the robotic system, including the stability the user (e.g. a position of the user's center of mass relative to a support area boundary). Using data from the robot sensors and user sensors, the system uses the different predictor modules to predict user movement based on prior training data. The system transmits the data from the predictor and body observer modules to the gait planner module. Using information related to the type of motion the robotic system is emulating, such as crawling depicted in the figure, the gait planner module may determine one or more movements for the various robotic limbs of the system to facilitate the desired movement of the user. For example, the gait planner may command the robotic limbs to follow a gait pattern similar to that described above relative to FIGS. 5-8 when helping a user crawl along the ground. In either case, once the appropriate robotic limb movements are determined, the gait planner module may then command one or more actuator drivers associated with the robotic limbs to move the robotic limbs to the desired new positions. This process may then continue for as long as the user operates the robotic system in this mode of operation.

Figure 13:
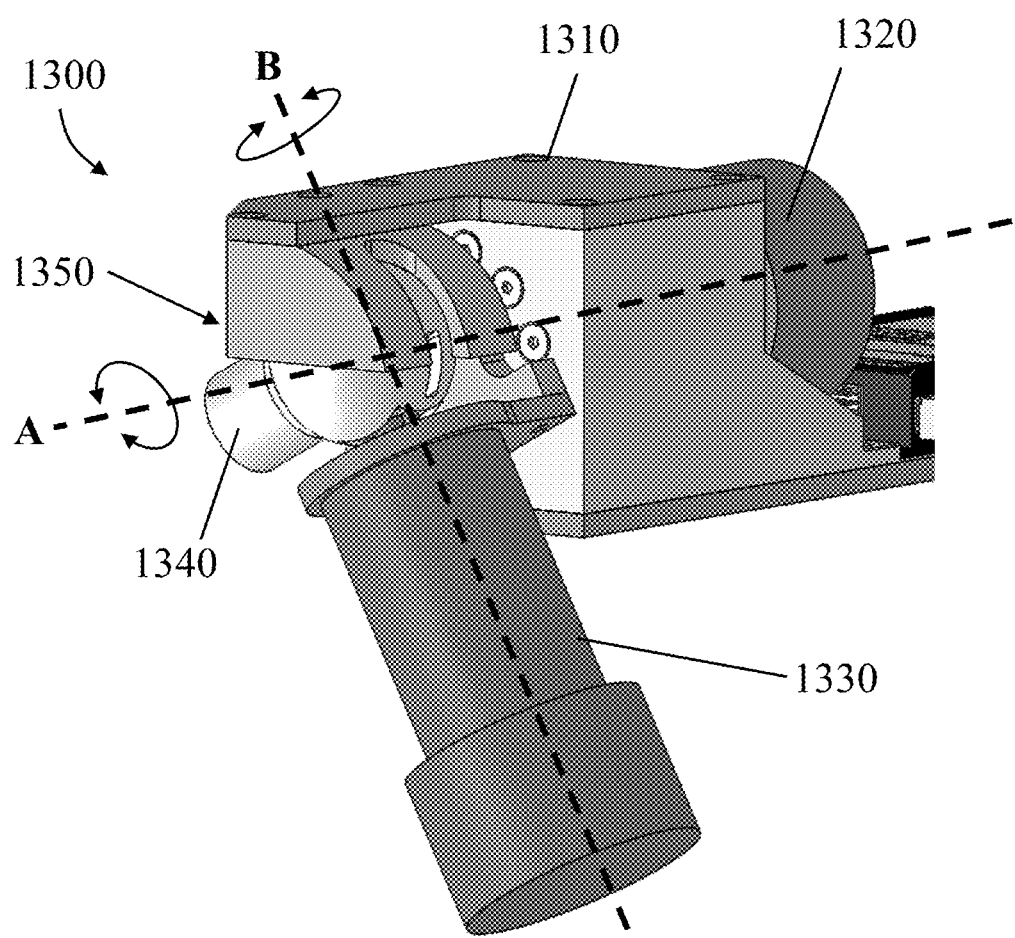
FIG. 13 is a schematic representation of one embodiment of an actuator for a robotic system.

As discussed previously, in some embodiments, a robotic system may include one or more robotic limbs movable via an actuated joint, such as an actuated shoulder joint. In some instances, an actuated shoulder joint may be constructed to have two rotational degrees of freedom for actuating and moving a robotic limb. For example, FIG. 13 depicts one illustrative embodiment of an actuated joint with two rotational degrees of freedom. In this embodiment, the actuated joint 1300 includes two motors 1320 and 1330. The first motor 1320 is mounted to a housing 1310, which may in turn be mounted to a harness or other suitable portion of a robotic system, and the first motor includes an output shaft which drives rotation about axis A. The second motor 1330 is coupled to the output shaft of the first motor 1320 and arranged with its output shaft perpendicular to the output shaft of the first motor 1320. In particular, the second motor drives rotation about axis B, which is perpendicular to axis A. A robotic limb is attachable to shaft 1340, which extends at an angle, and in some instances perpendicularly, from the output shaft of the second motor 1330. In this manner, when the first motor 1320 operates, it drives rotation of both the second motor 1330 and the robotic limb (attached to shaft 1340) about axis A, and when the second motor operates, it drives rotation of the robotic limb about axis B to provide the desired two rotational degrees of freedom. As depicted in the figure, in some embodiments, the actuated joint may include a ball-and-socket joint 1350 located between the two motors. In such a configuration, the axial forces transmitted along the robotic limb (and thus along the shaft 1340) are borne by the socket as the ball is compressed against it.

Figure 14:
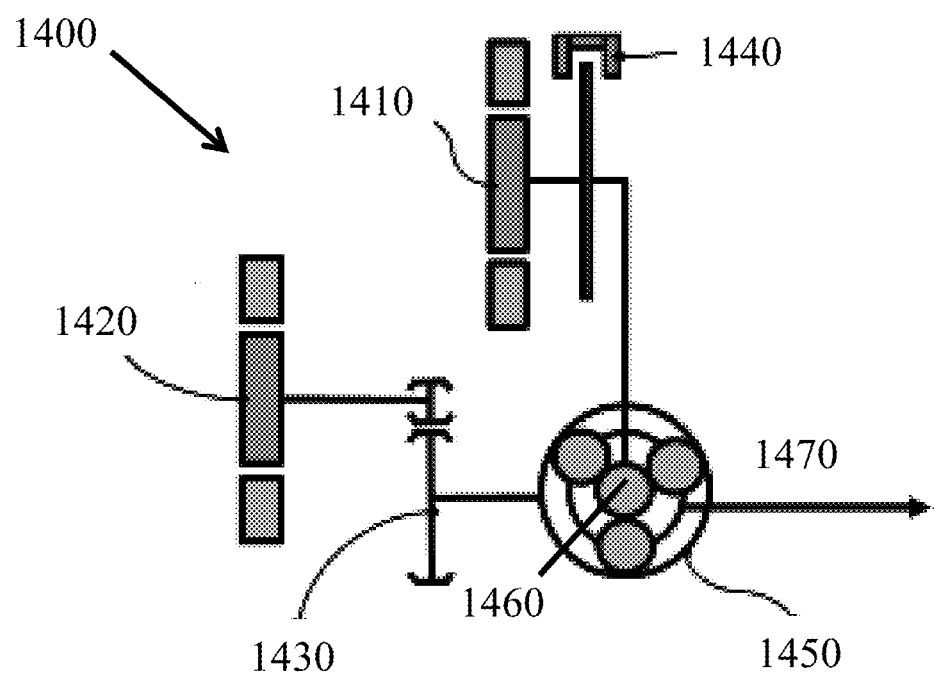
FIG. 14 is a schematic representation of one embodiment of an actuator for a robotic system.

In some embodiments, it may be desirable for the actuators of a robotic support system to be able to exert a large torque to bear the human body while also being able to move quickly when moving. FIG. 14 depicts one embodiment of a possible type of actuator capable of providing these desired characteristics. Specifically, the figure depicts a dual-speed dual-motor (DSDM) actuator 1400. As explained further below, the depicted actuator can change its effective gear ratio by a factor of more than 20, or any other appropriate factor, so that it can adapt itself to two different extreme load conditions. In the depicted embodiment, two motors 1410 and 1420 are engaged with an epicyclical gear train: one connected to the planet gear 1450, and the other to the sun gear 1460. For moving at a high speed, both motors work together to produce an output speed:

$$\text{Speed Summation } w_{out} = \frac{w_1}{R_1} + \frac{w_2}{R_2} \quad \text{Torque Sharing } \tau_{out} = R_1\tau_1 = R_2\tau_2$$

In the above equations $R_2$ is a reduction ratio of motor 1420 and $R_1$ is a smaller reduction ratio of motor 1410. Additionally, $w_1$, $w_2$, $w_{out}$ as well as the $\tau_1$, $\tau_2$, and $\tau_{out}$ are the rotational velocities and torques of the first and second motors and output 1470 respectively. During operation, when it is desirable to generate a large torque, motor 1410 may be locked with a brake 1440 associated with the motor shaft, and motor 1420 may be driven alone to produce a force through its larger reduction ratio to provide outputs of:

$$\text{Speed: } w_{out} = \frac{w_2}{R_2} \quad \text{Torque: } \tau_{out} = R_2\tau_2$$

In the currently disclosed systems, transient dynamics during gear shift is not a trivial problem. For example, unlike the standard gear shift operation for automobiles where the load has significant inertia that allows the vehicle to move continually during gear shift, it may be desirable for the load to be continually connected to an actuator to support the weight of a user during gear shifting. Therefore, the use of the above described dual-motor architecture, as well as an appropriate control algorithm, may allow for the seamless switching of the gear ratio even under a significant gravity load during use. For example, as a robot limb touches the ground and the load increases, the actuator may be shifted to the low-gear mode seamlessly by synchronizing motor 1420 to the output speed and then engaging the brake 1440. In turn, the actuator may switch back to the high-gear mode as soon as the leg loses contact with the ground by releasing the brake. In addition to the above noted gear shifting properties, in some embodiments a DSDM actuator may also be back-drivable when operating in a high-speed mode of operation, i.e. the brake is not engaged.

Although certain embodiments for actuated joints are depicted and described above, it should be understood that other actuated joints and/or other actuate limb configurations having fewer, or more, than two degrees of freedom also may be suitable, as the disclosure is not limited in this regard.

The above-described embodiments of control and movement prediction systems and methods, as well as other aspects of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, a tablet computer, a processor and memory embedded in a robotic system controller. Additionally, a computing device may be embedded in a device not generally regarded as a computing device but with suitable processing capabilities, including a Personal Digital Assistant (PDA), a smart phone, or any other suitable portable or fixed electronic device.

Also, a computing device may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format. Additionally, as indicated above, a computing device may receive input based on a user's movements, gestures, or a spatial state of the user.

Such computing devices may be interconnected by one or more networks in any suitable form, including as a body area network, a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosed embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, aspects of the current disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods according to the present disclosure need not reside on a single computer or processor, but may be distributed in a modular fashion amongst a number of different computers or processors to implement various aspects described herein.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Example: Stationary Operating Mode

Control laws for supporting a user wearer with a desired movement impedance were derived. Specifically, a feedback control algorithm for supporting a user was determined for a system including two robotic limbs with 6 degrees of freedom. Two of the actuators were replaced by passive springs. While this simplified the physical design, it also limited the achievable movement impedance. During the derivation, the 6-dimensional space was divided into two 3-dimensional spaces: one within the sagittal plane and the other in the frontal plane. It was also assumed that motion was limited to within only these two planes. Thus the system was symmetric and no principal axis of stiffness spanned both the sagittal and frontal planes, justifying this simplification. Though gravitational forces were not explicitly handled in the derivations, length measurements of the compressible robotic limbs served as indirect measurements of gravity's influence on the system. The derived control laws were then successfully implemented in a robotic system as described herein to both support and maintain a user in a stationary predefined position by applying restoring forces to the user in the sagittal and/or frontal planes.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:
1. A robotic system for supporting a user, the robotic system comprising:
two or more actuated robotic limbs configured to be attached to a user's torso and to bear at least a portion of the user's weight when the user is in a first position;

one or more sensors configured to detect movement of the user; and a controller operatively coupled to the two or more robotic limbs and the one or more sensors, wherein in response to the one or more sensors detecting movement of the user away from the first position, the controller controls the two or more robotic limbs to apply a restoring force to the user, wherein the restoring force is directed towards the first position.

2. The robotic system of claim 1, wherein the controller determines a magnitude of the restoring force based on a distance of the movement of the user away from the first position and/or a velocity of the movement away from the first position.

3. The robotic system of claim 1, wherein the controller determines a magnitude of the restoring force based on a direction of the movement of the user away from the first position.

4. The robotic system of claim 1, wherein a portion of the user's lower body is in contact with a surface when the user is supported by the robotic system, and wherein the one or more sensors includes at least one sensor configured to be positioned on the portion of the user's lower body.

5. The robotic system of claim 1, wherein in response to the one or more sensors detecting movement of the user away from the first position greater than a movement threshold, the controller actuates the two or more robotic limbs to move to support the user in a second position.

6. The robotic system of claim 5, wherein the movement threshold is an absolute distance threshold and/or a stability threshold.

7. A method of operating a robotic system for supporting a user, the method comprising:

setting a first position for a user supported by a robotic system, the robotic system comprising two or more actuated robotic limbs configured to be attached to the user's torso and to bear at least a portion of the user's weight when the user is in the first position;

detecting movement of the user away from the first position; and applying a restoring force to the user with the two or more robotic limbs in response to the detected movement of the user away from the first position, wherein the restoring force is directed towards the first position.

8. The method of claim 7, further comprising determining a magnitude of the restoring force based on a distance of the movement of the user away from the first position and/or a velocity of the movement away from the first position.

9. The method of claim 7, further comprising determining a magnitude of the restoring force based on a direction of the movement of the user away from the first position.

10. The method of claim 7, further comprising detecting movement of the user away from the first position greater than a movement threshold; and moving the two or more robotic limbs to support the user in a second position.

11. The method of claim 7, further comprising setting a desired movement impedance in at least one direction.

12. The method of claim 11, further comprising adjusting the restoring force based on the desired movement impedance.

13. A robotic system for supporting a user, the robotic system comprising:

two or more robotic limbs configured to be attached to a user's torso and to support bear at least a portion of the user's weight;

a user sensor configured to detect a spatial state of the user relative to the two or more robotic limbs; and a controller operatively coupled to the two or more robotic limbs and the user sensor, wherein the controller predicts a user movement based on the spatial state of the user and controls at least one robotic limb of the two or more robotic limbs to move from a first position to a second position based on the predicted user movement.

14. The robotic system of claim 13, further comprising a robot sensor configured to detect a spatial state of the two or more robotic limbs.

15. The robotic system of claim 13, wherein the two or more robotic limbs include a first robotic limb positioned at a first side of the user's torso and a second robotic limb positioned at a second side of the user's torso opposite the first side.

16. The robotic system of claim 13, wherein the user movement is a crawling movement.

17. The robotic system of claim 13, wherein the controller uses a partial least squares regression algorithm and/or a support vector machine algorithm to predict the user movement.

18. The robotic system of claim 13, wherein the robotic system maintains a center of mass of the user within a stability region during movement of the at least one robotic limb from the first position to the second position.

19. A method of operating a robotic system for supporting a user, the method comprising:

sensing a spatial state of a user relative to a robotic system, the robotic system comprising two or more robotic limbs configured to be attached to the user's torso and to bear at least a portion of the user's weight;

predicting a user movement based on the spatial state of the user; and controlling at least one robotic limb of the two or more robotic limbs to move from a first position to a second position based on the predicted user movement.

20. The method of claim 19, further comprising sensing a spatial state of the robotic system.

21. The method of claim 19, wherein the user movement is a crawling movement.

22. The method of claim 19, wherein predicting the user movement includes performing a partial least squares regression analysis and/or a support vector machine analysis.

23. The method of claim 19, further comprising determining a stability area; and maintaining a center of mass of the user within the stability area during movement of the at least one robotic limb from the first position to the second position.

24. A robotic system comprising:

a harness wearable by a user on at least a portion of the user's torso;

a first robotic limb attached to the harness, the first robotic limb extending from a first side of the harness;

a second robotic limb attached to the harness, the second robotic limb extending from a second side of the harness opposite the first side of the harness, wherein the first and second robotic limbs are configured to bear at least a portion the user's weight and to support at least a portion of the user's body at a position above a surface;

a first actuator operatively coupled to the harness and the first robotic limb, the first actuator configured to move the first robotic limb relative to the harness; and a second actuator operatively coupled to the harness and the second robotic limb, the second actuator configured to move the second robotic limb relative to the harness.

25. The robotic system of claim 24, further comprising one or more user sensors configured to be attached to the user and to detect a position and/or a movement of a portion of the user's body.

26. The robotic system of claim 25, further comprising one or more robot sensors associated with each of the first and second robotic limbs and configured to detect a position of the first and second robotic limbs and/or forces acting on the first and second robotic limbs.

27. The robotic system of claim 26, further comprising a controller operatively coupled to the first and second actuators, the one or more user sensors, and the one or more robot sensors, the controller configured to selectively actuate the first and second actuators based on input detected from the one or more user sensors and/or the one or more robot sensors.

28. The robotic system of claim 26, wherein the one or more user sensors and one or more robot sensors comprise at least one selected from the group of an inertial measurement unit, a force sensor, and a pressure sensor.

29. The robotic system of claim 24, wherein each actuator of the first and second actuators has two rotational degrees of freedom.

30. The robotic system of claim 24, wherein each of the first and second robotic limbs are telescoping robotic limbs that include a first limb portion and a second limb portion that telescopes out from the first limb portion.

* * * * *

UNITED STATES PATENT AND TRADEMARK OFFICE
CERTIFICATE OF CORRECTION

PATENT NO. : 10,118,291 B2
APPLICATION NO. : 15/455517
DATED : November 6, 2018
INVENTOR(S) : Haruhiko Harry Asada et al.

Page 1 of 1

It is certified that error appears in the above-identified patent and that said Letters Patent is hereby corrected as shown below:

In the Claims

In Claim 13, at Column 21, Line 66, the word "support" should be removed.

Signed and Sealed this
Twenty-ninth Day of January, 2019

Andrei Iancu
*Director of the United States Patent and Trademark Office*